(12) United States Patent
Nagao et al.

(10) Patent No.: US 11,706,355 B2
(45) Date of Patent: Jul. 18, 2023

(54) SYSTEM AND METHOD FOR PERFORMING SERVICE REGISTRATION PROCESSING IN RESPONSE TO ACCESS REQUEST FROM CLIENT TERMINAL

(71) Applicant: CANON KABUSHIKI KAISHA, Tokyo (JP)

(72) Inventors: Keisuke Nagao, Kanagawa (JP); Hiroki Hachiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/841,590

(22) Filed: Jun. 15, 2022

(65) Prior Publication Data
US 2022/0417371 A1 Dec. 29, 2022

(30) Foreign Application Priority Data

Jun. 28, 2021 (JP) ................................. 2021-106361

(51) Int. Cl.
*H04N 1/00* (2006.01)
*G06F 3/12* (2006.01)

(52) U.S. Cl.
CPC ....... *H04N 1/00344* (2013.01); *G06F 3/1204* (2013.01); *G06F 3/1229* (2013.01); *G06F 3/1285* (2013.01); *H04N 1/00244* (2013.01); *H04N 1/00464* (2013.01)

(58) Field of Classification Search
None
See application file for complete search history.

(56) References Cited

U.S. PATENT DOCUMENTS

| | | | |
|---|---|---|---|
| 2006/0161658 A1 | 7/2006 | Noguchi | 709/225 |
| 2009/0009797 A1* | 1/2009 | Nimura | B41J 2/17566 |
| | | | 358/1.15 |
| 2018/0165751 A1* | 6/2018 | Chiyo | G06Q 10/0833 |
| 2018/0241833 A1 | 8/2018 | Hachiya | H04L 29/08 |
| 2018/0349835 A1* | 12/2018 | Ishida | G06Q 10/087 |
| 2021/0035177 A1 | 2/2021 | Hachiya | G06Q 30/06 |
| 2021/0191673 A1* | 6/2021 | Ogawa | G06F 3/1229 |

FOREIGN PATENT DOCUMENTS

JP 2005-059303 3/2005

* cited by examiner

*Primary Examiner* — Henok Shiferaw
(74) *Attorney, Agent, or Firm* — Venable LLP

(57) ABSTRACT

Provided is a system including: a printing apparatus; an information processing apparatus; and a server system. The printing apparatus outputs identification information on the printing apparatus. The information processing apparatus transmits the identification information obtained from the printing apparatus based on acceptance of an instruction for receiving a first service, and performs display control of the information processing apparatus. The server system executes processing for confirmation as to whether or not the printing apparatus identified by the identification information transmitted from the information processing apparatus is registered for a second service, and provides data for displaying an item for the second service in a case where the printing apparatus is not registered for the second service. The information processing apparatus displays an item for registering the printing apparatus for the second service on a display unit of the information processing apparatus based on the provided data.

13 Claims, 10 Drawing Sheets

REGISTERED INFORMATION TABLE ~601

| PRINTER MODEL | SERIAL NUMBER | MAC ADDRESS | REGISTRATION ID |
|---|---|---|---|
| TS6300 | AAAAAAAAA | BBBBBBBB | 1111 |
| TS5300 | CCCCCCCC | DDDDDDDD | 2222 |

ID TABLE ~602

| PRINTER MODEL | SERIAL NUMBER | MAC ADDRESS | TEMPORARY REGISTRATION ID |
|---|---|---|---|
| TS6300 | EEEEEEEE | FFFFFFFF | 3333 |
| | | | |

FIG.6

REGISTERED INFORMATION TABLE 1001

| PRINTER MODEL | SERIAL NUMBER | MAC ADDRESS | REGISTRATION ID |
|---|---|---|---|
| TS6300 | AAAAAAAA | BBBBBBBB | 1111 |
| TS5300 | CCCCCCCC | DDDDDDDD | 2222 |
| TS6300 | EEEEEEEE | FFFFFFFF | 3333 |

ID TABLE 1002

| PRINTER MODEL | SERIAL NUMBER | MAC ADDRESS | TEMPORARY REGISTRATION ID |
|---|---|---|---|
| TS6300 | EEEEEEEE | FFFFFFFF | 3333 |
| | | | |

SYSTEM AND METHOD FOR PERFORMING SERVICE REGISTRATION PROCESSING IN RESPONSE TO ACCESS REQUEST FROM CLIENT TERMINAL

BACKGROUND

Field

The present disclosure relates to a technique for a system configured to carry out service registration processing in response to an access request from a client terminal.

Description of the Related Art

Printer support services through the Internet are in practical use today. One of the support services in practical use is a support service which guides to an online shopping site that sells replacement ink tanks in a case where a remaining amount of an ink in a printer is low, for example. According to Japanese Patent Laid-Open No. 2005-059303, a client terminal apparatus transmits information concerning printer consumable supplies to a service providing apparatus through a network. Then, the client terminal apparatus receives information necessary for generating a screen for providing a service corresponding to the information concerning the consumable supplies, and then generates and presents the screen to a user. This enables the user to request a necessary service through the screen.

In the meantime, various new services are introduced as the printer support services besides the ink selling service. Such new services include an ink delivery service, a point reward service that grants points in return to each printing operation, and so forth.

SUMMARY

Japanese Patent Laid-Open No. 2005-059303 is designed to guide to the online shopping site that sells replacement ink tanks in the case where the remaining amount of the ink in the printer is low. However, this technique does not allow registration for or usage of other printer support services. For this reason, in a case of a registration for a new support service, a user has to download dedicated software from a website and to register for the service. Accordingly, there is a problem of a cumbersome operation for registration by the user.

In view of the aforementioned problem, an object of the present disclosure is to enable a user to register for such a support service easily.

An aspect according to the present disclosure is a system including:
a printing apparatus;
an information processing apparatus on which software for using a function of the printing apparatus is installed; and
a server system, in which
the printing apparatus includes an output unit configured to output identification information on the printing apparatus,
the information processing apparatus includes
a transmission unit configured to transmit the identification information on the printing apparatus obtained from the printing apparatus based on acceptance of an instruction for receiving a first service through a screen provided by the software, and
a display control unit configured to perform display control of the information processing apparatus,
the server system includes
a confirmation unit configured to execute processing for confirmation as to whether or not the printing apparatus identified by the identification information on the printing apparatus transmitted from the information processing apparatus is registered for a second service being different from the first service, and
a providing unit configured to provide data for displaying an item for the second service in a case where the printing apparatus is not registered for the second service, and
the display control unit displays an item for registering the printing apparatus for the second service on a display unit of the information processing apparatus based on the provided data.

Further features of the present invention will become apparent from the following description of exemplary embodiments with reference to the attached drawings.

BRIEF DESCRIPTION OF THE DRAWINGS

FIG. 6 is a diagram showing an example of a registered information table and an example of an id table of the first embodiment;

DESCRIPTION OF THE EMBODIMENTS

An embodiment of the present disclosure will be described below in detail with reference to the accompanying drawings. It is to be noted that the following embodiment is not intended to unnecessarily limit the scope of the invention as defined in the appended claims, and that a combination of all of the features described below is not always essential as a solution of the present disclosure.

First Embodiment

Figure 1:
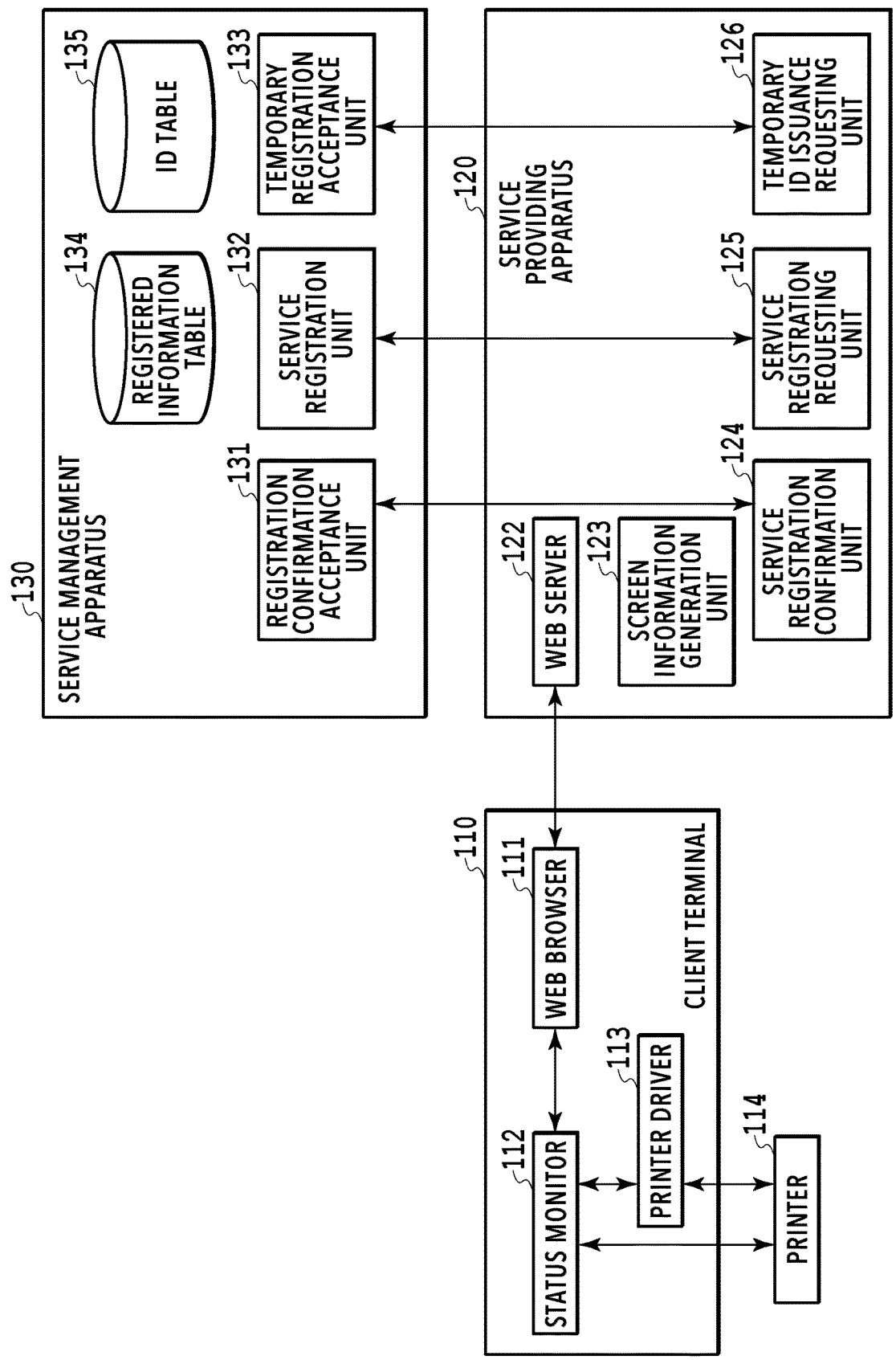
FIG. 1 is a block diagram showing an example of an overall configuration of a communication system of a first embodiment.

<Configuration of Communication System>
FIG. 1 is a block diagram showing an example of an overall configuration of a communication system of the present embodiment. A configuration of a system that includes a client terminal 110, a service providing apparatus 120, and a service management apparatus 130 will be described below with reference to FIG. 1 as a communication system of the present embodiment.

The service providing apparatus 120 and the service management apparatus 130 that function as servers constitute a group of information processing apparatuses. The group of information processing apparatuses realize various functions including provision of printer support services in response to an access request outputted from the client terminal 110, confirmation of a status of subscription to the services, registration for the services, and the like. A personal computer or the like can typically be used as such an information processing apparatus. The client terminal 110, the service providing apparatus 120, and the service management apparatus 130 are communicably connected to one another through a network.

This network is the Internet or a local area network (LAN), for example, which enables communication among the information processing apparatuses. At least one device is connected to the client terminal 110. The communication system of the present embodiment provides various functions including provision of support services concerning a printer connected to the client terminal 110, confirmation of a status of subscription to the support services, registration for the support services, and the like.

FIG. 1 shows an example in which a printer 114 is connected to the client terminal 110. To be more precise, an ink jet printer adopting an ink jet printing mode, a laser beam printer adopting an electrophotographic mode, or the like can be used as the printer 114. A web browser 111, a status monitor 112, and a printer driver 113 are installed on the client terminal 110. These constituent units may be considered either as software programs provided to the client terminal 110 or software modules to be implemented by causing a CPU 201 (FIG. 2) of the client terminal 110 to execute the software programs. Here, the printer is also referred to as a printing apparatus.

The web browser 111 runs on the client terminal 110. By using the web browser 111, the client terminal 110 can obtain information for use in generating a given GUI screen (hereinafter referred to as "screen information", "screen data", and so forth) from a web server 122 that runs on the service providing apparatus 120 and by way of the network. The screen information is described in the HTML, for example. The client terminal 110 can interpret an HTML file obtained from the web server 122 and display the given GUI screen based on the interpretation on the web browser 111.

The status monitor 112 can obtain information that indicates a status of the printer 114 either by communicating with the printer 114 through the printer driver 113 or by directly communicating with the printer 114. Moreover, the status monitor 112 has a function to display a message and the like concerning the status of the printer 114 on a display unit 205 (FIG. 2), thus presenting the message to a user.

Meanwhile, the status monitor 112 is activated in a case where a prescribed event takes place in the printer 114. For example, the status monitor 112 is activated in a case where it is determined that a remaining amount of an ink in the printer 114 comes down (to be more precise, that the remaining amount of the ink falls equal to or below a predetermined threshold) based on the information obtained from the printer 114. Then, the CPU 201 (FIG. 2) of the client terminal 110 displays information concerning refill of the ink on the display unit 205 together with the aforementioned information on the status of the printer 114 by using the status monitor 112. Here, it is possible to activate the status monitor 112 not only in the case of the occurrence of the prescribed event but also at a desired timing in accordance with a prescribed operation performed by the user. In addition, the status monitor 112 has a function to access a site that sells replacement ink tanks.

For example, in a case where a "go to online shop" button 401 (FIG. 4) to be described later is pressed by the user, the CPU 201 of the client terminal 110 transmits the information on the printer 114 obtained by the status monitor 112 to an external server by using the web browser 111. The information on the printer 114 obtained by the status monitor 112 and transmitted by the CPU 201 preferably includes the information concerning the remaining amounts of the inks in the printer 114 and identification information on the printer (model information, a serial number, a MAC address, and the like of the printer 114).

Here, the CPU 201 of the client terminal 110 executes display control processing for displaying a web page on the display unit 205 by using the status monitor 112 and the web browser 111. This display control processing will be described later with reference to FIG. 5.

The printer driver 113 is software for controlling the printer 114, which gives a print instruction to the printer 114 based on a print command issued by application software mainly under management of an operating system at the client terminal. Upon receipt of a notice from the printer driver 113, the web browser 111 starts access to the service providing apparatus 120.

An address used in the present embodiment is a uniform resource locator (URL) that specifies a location of information on the network and a method of retrieving the information, for example. Although FIG. 1 shows the example in which the single printer 114 is connected to the client terminal 110, multiple printers may be connected to the client terminal instead. In that case, the client terminal is supposed to be provided with multiple printer drivers necessary for controlling the multiple printers. Here, each of the printers corresponds to one of the printer drivers.

The service providing apparatus 120 is the information processing apparatus that includes the web server 122, a screen information generation unit 123, a service registration confirmation unit 124, a service registration requesting unit 125, and a temporary id issuance requesting unit 126. These constituent units may be considered either as software programs provided to the service providing apparatus 120 or as software modules to be implemented by causing a CPU of the service providing apparatus 120 to execute the software programs.

The service providing apparatus 120 analyzes the access request that the web server 122 receives from the client terminal 110, thereby obtaining information on the URL included in the access request and the identification information on the printer (the model, the serial number, and the MAC address of the printer). Subsequently, the service registration confirmation unit 124 delivers the identification information on the printer to a registration confirmation acceptance unit 131 of the service management apparatus 130, thus confirming the presence of service registration for the printer as to whether or not the target printer is registered for a support service.

Here, in a case where the target printer is not registered for the support service, the temporary id issuance requesting unit 126 requests issuance of a temporary id along with a delivery of the identification information on the printer to a temporary registration acceptance unit 133. The screen information generation unit 123 generates the screen information based on a service registration status confirmed by the service registration confirmation unit 124, and the web server 122 transmits the generated screen information to the web browser 111 of the client terminal 110.

Thereafter, in a case where there is a request for registration processing through the web browser 111 on the client terminal 110 side, The web browser 111 notifies the service providing apparatus 120 of the request. Subsequently, the service registration requesting unit 125 requests a service registration unit 132 of the service management apparatus 130 to register the target printer for the support service.

The service management apparatus 130 includes the registration confirmation acceptance unit 131, the service registration unit 132, and the temporary registration acceptance unit 133. These constituent units may be considered either as software programs provided to the service management apparatus 130 or software modules to be implemented by causing a CPU of the service management apparatus 130 to execute the software programs.

Meanwhile, the service management apparatus 130 includes a registered information table 134 and an id table 135. Each of the registered information table 134 and the id table 135 is a data table to be stored in an HDD or the like provided to the service management apparatus 130.

In a case of acceptance of a request to confirm the presence of a service registration on behalf of the target printer, the registration confirmation acceptance unit 131 confirms whether or not the target printer is registered for the support service by using information held in the registered information table 134.

In a case where there is a request for the temporary registration of the target printer for the support service, the temporary registration acceptance unit 133 additionally describes the identification information on the target printer in the id table 135. In the case where there is a request for registration of the target printer for the support service, the service registration unit 132 confirms information held in each of the registered information table 134 and the id table 135. Then, the service registration unit 132 searches for information concerning the target printer out of the information held by the id table 135, and additionally describes the information obtained as a result of this search in the registered information table 134. Note that the registered information table 134 and the id table 135 will be described later with reference to FIGS. 6, 10, and the like.

Although the service providing apparatus 120 and the service management apparatus 130 are provided as different servers from each other in the present embodiment, a single server apparatus may execute the functions of the service providing apparatus 120 and the service management apparatus 130 instead. In the meantime, the service providing apparatus 120 may be formed from multiple server apparatuses. In other words, the functions of the service providing apparatus 120 may be executed by operations of the multiple server apparatuses in coordination. The service management apparatus 130 may also be formed from multiple server apparatuses likewise. In the present disclosure, a configuration formed from a single server apparatus or from multiple server apparatuses will be referred to as a server system.

<Support Services>

The support services are services concerning the printer, which include an ink selling service, an automatic ink delivery service, an ink subscription service, a point reward service that grants to the user points in return to each printing operation, and so forth.

In the following, a description will be given of an example of displaying an item for enabling a registration for the point reward service based on a user instruction for receiving the ink selling (purchase) service. However, the present embodiment is not limited only to this configuration. An item for enabling a registration for a second support service may be displayed based on a user instruction for receiving a first support service.

<Hardware Configuration of Client Terminal>

Figure 2:
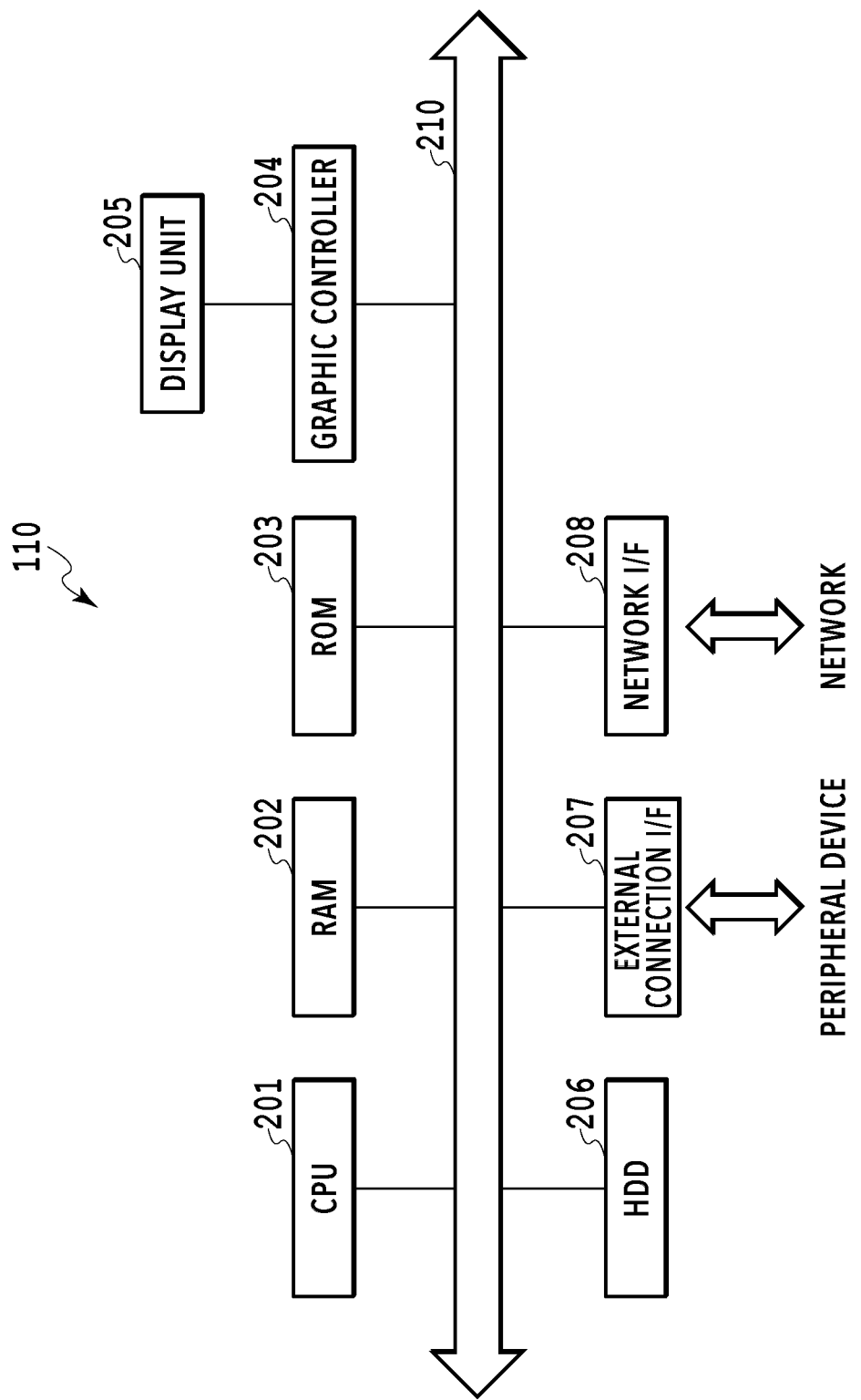
FIG. 2 is a block diagram showing an example of a hardware configuration of a client terminal of the first embodiment.

FIG. 2 is a block diagram showing an example of a hardware configuration of the client terminal 110 of the present embodiment. The client terminal 110 is the information processing apparatus that includes the CPU 201, a RAM 202, a ROM 203, a graphic controller 204, the display unit 205, and a hard disk drive (HDD) 206. The client terminal 110 further includes an external connection interface (the term "interface" will be hereinafter abbreviated as "I/F") 207, and a network I/F 208. The respective constituent units mentioned above are communicably connected to one another through a bus 210.

The CPU 201 is formed from an operation circuit and configured to conduct overall control of the client terminal 110. The CPU 201 reads programs stored in the ROM 203 or the HDD 206 and loads the programs into the RAM 202 so as to execute a variety of processing. The ROM 203 stores system programs and the like used for controlling the client terminal 110. The graphic controller 204 generates screens to be displayed on the display unit 205. The HDD 206 has a function as a storage area which stores application programs and the like that execute the variety of processing. Here, the HDD 206 is an example of a storage device, and the client terminal 110 can also be constructed by using a solid state drive (SSD) and the like instead of the HDD. The external connection I/F 207 is an interface for connecting various peripheral devices to the client terminal 110. For example, a display unit, a keyboard, a mouse, and the like can be connected through the external connection I/F 207. The network I/F 208 performs communication with external devices such as the service providing apparatus 120 through the network based on the control of the CPU 201.

Note that the hardware configuration of the client terminal 110 shown in FIG. 2 is a typical configuration as the information processing apparatus. Accordingly, the service providing apparatus 120 and the service management apparatus 130 can also be realized by the information processing apparatuses having the hardware configuration shown in FIG. 2. As mentioned earlier, the service providing apparatus 120 and the service management apparatus 130 may be implemented by causing the single information processing apparatus to execute the functions of the service providing apparatus 120 and the service management apparatus 130. In the meantime, the service providing apparatus 120 may be formed from multiple information processing apparatuses. Likewise, the service management apparatus 130 may also be formed from multiple information processing apparatuses. In other words, each of the service providing apparatus 120 and the service management apparatus 130 may be implemented by at least one information processing apparatus (the server system).

<Printer Status Monitor Screen>

Figure 3:
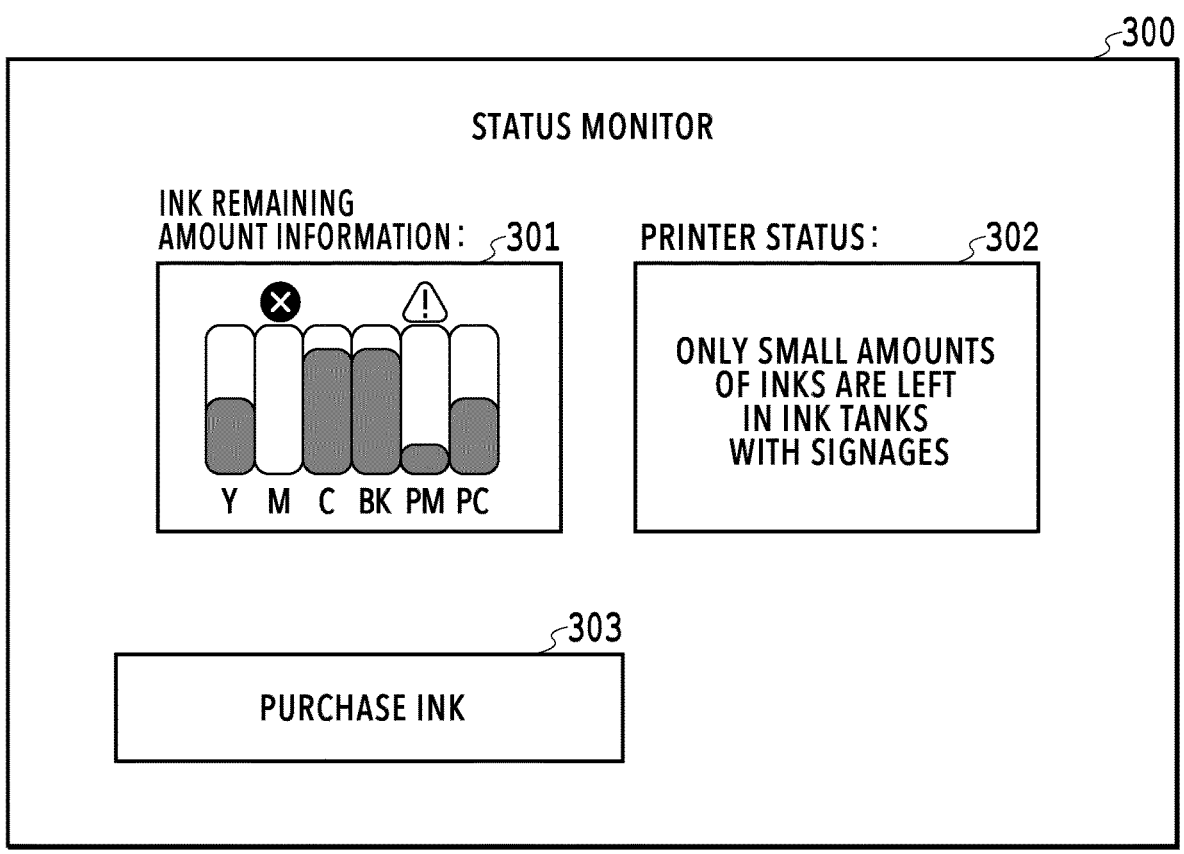
FIG. 3 is a diagram showing an example of a printer status monitor screen of the first embodiment.

FIG. 3 is a diagram showing an example of a printer status monitor screen to be provided by the status monitor 112 of the present embodiment. As shown in FIG. 3, information concerning the status of the printer 114 connected to the client terminal 110 is displayed on a printer status monitor screen 300. The printer status monitor screen 300 includes a first display region 301, a second display region 302, and a "purchase ink" button 303 (an instruction item).

The first display region 301 is a region for displaying graphics or animations for demonstrating remaining amounts of inks in respective ink tanks loaded on the printer 114. On the other hand, the second display region 302 is a region for displaying sentences and the like for indicating the status of the printer 114.

In the example shown in FIG. 3, the information concerning the remaining amounts of the inks in the ink tanks loaded on the printer 114 are displayed on the printer status monitor screen 300 on the ink color basis. Specifically, the information concerning the remaining amounts of the inks such as a full amount of the ink (FULL), about a half of the remaining amount of the ink (HALF), a small amount of the ink (LOW), and no amount of the ink (OUT) is displayed in the first display region 301 in an indicator mode. Moreover, in the case of the small amount of the ink (LOW) or no amount of the ink (OUT), the status monitor 112 displays an icon "!" or "x" in the vicinity of the corresponding indicator, thereby providing intuitive display to the user.

<First Support Service Start Screen>

Figure 4:
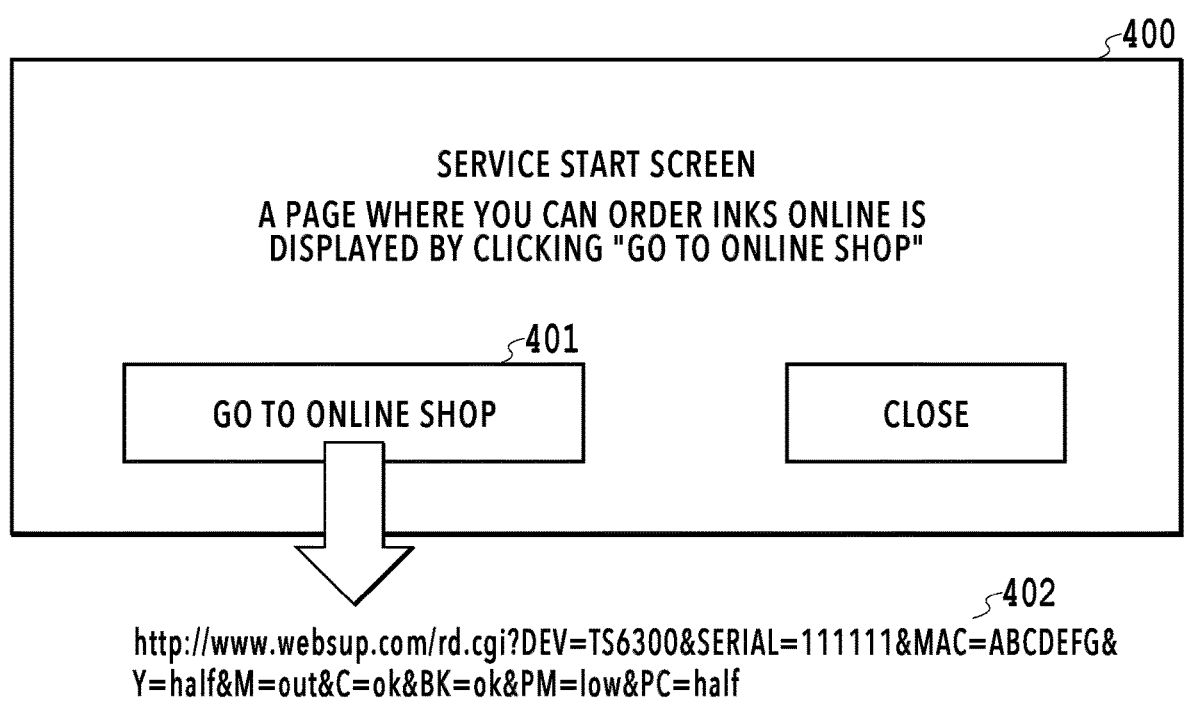
FIG. 4 is a diagram showing an example of a support service start screen of the first embodiment.

FIG. 4 is a diagram showing an example of a GUI screen that asks the user whether or not to start the support service for purchasing an ink for the printer to be displayed on the web browser 111, or more specifically, whether or not to call up a screen of an online shop. Note that this screen will be referred to as a "support service start screen". A support service start screen 400 in FIG. 4 is a GUI screen which is displayed in response to an action to press the "purchase ink" button 303 on the printer status monitor screen 300, and includes the "go to online shop" button 401 and a "close" button. The "go to online shop" button 401 is a button for accepting a request for the ink selling (purchase) service as one of first support services through the Internet. In other words, the "go to online shop" button 401 can be deemed as an instruction item for accepting an instruction to start the ink selling (purchase) service.

In the case where the "go to online shop" button 401 is pressed by the user, a URL 402 is generated based on the information on the remaining amounts of the inks in the printer 114 and the like, and the web browser 111 accesses the web server 122 while attaching parameters included in the URL 402. Here, as shown in FIG. 4, the generated URL 402 also attaches parameters including a device name (the model information) of the printer 114, the serial number of the printer 114, the MAC address of the printer 114, and the like. The URL 402 also includes the information concerning the remaining amounts of the inks. In the example of FIG. 4, the full amount of the ink is indicated as "ok", about the half of the remaining amount of the ink is indicated as "half", the small amount of the remaining amount of the ink is indicated as "low", and running out of the ink is indicated as "out".

<Processing to Register Target Printer for Second Support Service>

Figure 5:
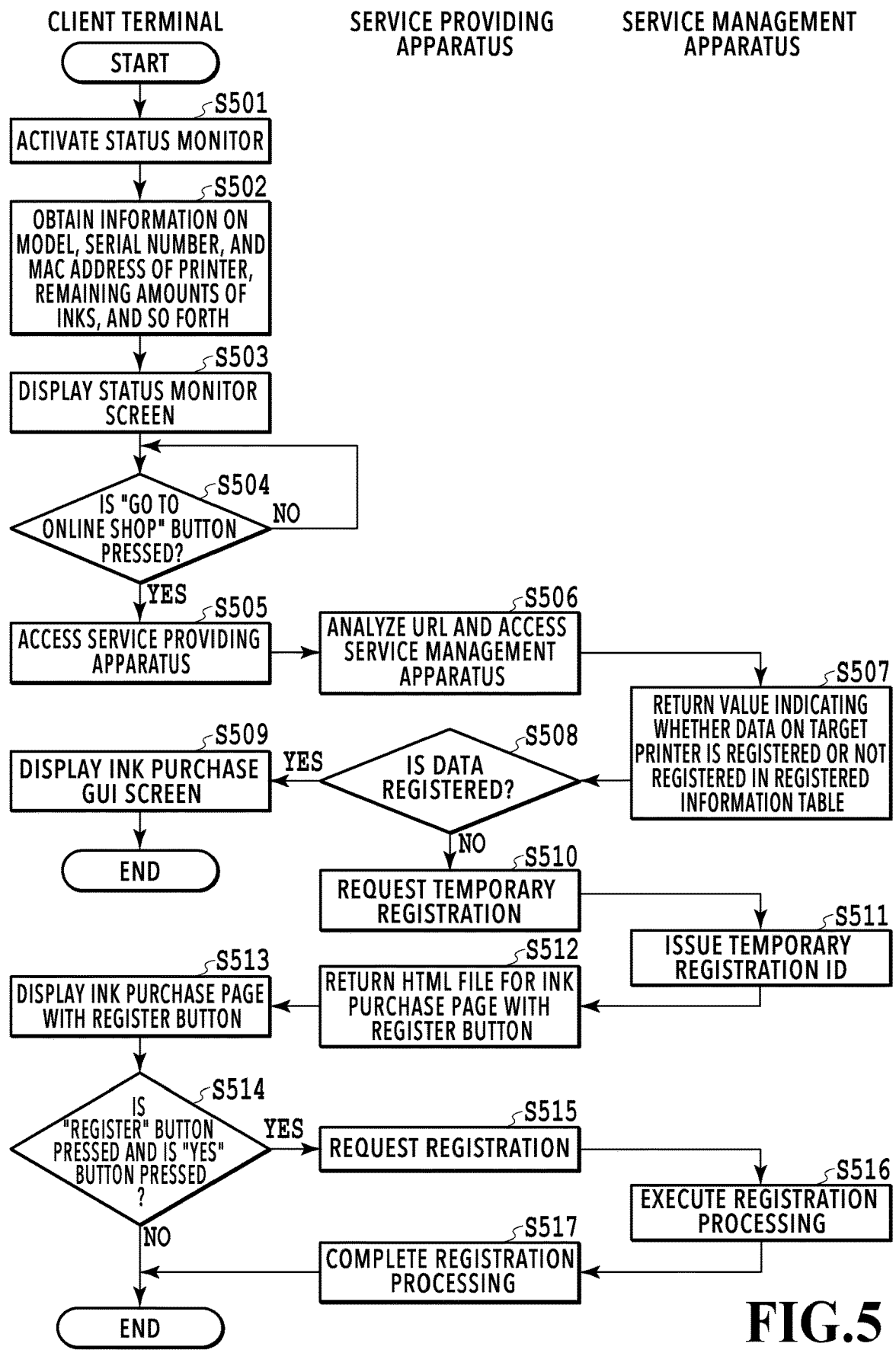
FIG. 5 is a diagram showing an example of a flowchart of registration processing of a target printer for a support service of the first embodiment.

FIG. 5 shows an example of a flowchart of a series of processing that includes registration processing of the target printer for a second support service of this embodiment. The series of processing is processing to take place in a case where the status monitor 112 displays the printer status monitor screen 300 in response to a user instruction such as a print instruction and the user presses the "go to online shop" button 401 after pressing the "purchase ink" button 303. In this case, the client terminal 110 accesses the service providing apparatus 120, and the service providing apparatus 120 carries out processing to request for registration for the second support service and the like.

Here, the processing shown in the flowchart of FIG. 5 is carried out by causing the respective CPUs of the client terminal 110, the service providing apparatus 120, and the service management apparatus 130 to load program codes stored in the ROM or the HDD into the RAM and to execute the program codes. Moreover, each expression "in S***" in the following description means a step in the series of processing.

In S501, the CPU 201 of the client terminal 110 activates the status monitor 112 in the case of the occurrence of an event in the printer 114 to be presented to the user. Alternatively, the status monitor 112 may be manually activated by an operation of the user irrespective of the occurrence or non-occurrence of such an event. In the present embodiment, a description will be given of an example in which the event to be presented to the user is a shortage of the remaining amount of the ink in any of the ink tanks loaded on the printer 114.

In S502, the CPU 201 of the client terminal 110 communicates with the printer 114 by using the status monitor 112 and the printer driver 113, thereby obtaining the information concerning the printer 114. The information acquired in this step includes the model information on the printer 114, the serial number of the printer 114, the MAC address of the printer 114, and the status information such as the remaining amounts of the inks in the respective ink tanks loaded on the printer 114.

The status monitor 112 can obtain the information indicating stages of the remaining amounts of the inks. For example, the status monitor 112 obtains information that indicates any of four stages of "FULL" in the case of the full amount of the ink, "HALF" in the case of about a half of the remaining amount of the ink, "LOW" in the case of a small amount of the ink, and "OUT" in the case of no remaining amount of the ink, for example. The following description will be given of the example in which the remaining amounts of the inks are indicated by using four stages. However, the number of stages is not limited only to four but only needs to be two or more stages.

In S503, the CPU 201 of the client terminal 110 displays the printer status monitor screen 300 on the display unit 205. Here, as shown in FIG. 3, the information on the remaining amounts of the inks obtained in S502 is displayed in the first display region 301 on the printer status monitor screen 300.

In S504, the CPU 201 of the client terminal 110 determines whether or not the "go to online shop" button 401 on the support service start screen 400 is pressed, the button which is displayed as a result of pressing the "purchase ink" button 303. The processing goes to S505 in the case where a result of the determination in this step turns out to be true. On the other hand, the operation to press the "go to online shop" button 401 by the user is awaited in the case where the result turns out to be false.

In S505, the CPU 201 of the client terminal 110 generates the URL by using the information obtained in S502, and accesses the service providing apparatus 120 based on the generated URL. In other words, the CPU 201 issues a request for display of the online shop. The URL generated in this step is formed by using various parameters concerning the printer 114. Specifically, these parameters are the respective parameters of the model, the serial number, and the MAC address of the printer as shown in the URL 402 of FIG. 4. In addition thereto, the parameters include respective parameters of the remaining amounts of the inks in the respective ink tanks loaded on the printer, namely, Y (yellow), M (magenta), BK (black), PM (photo magenta), PC (photo cyan), and so forth.

In S506, the CPU of the service providing apparatus 120 functions as the web server 122 and the service registration confirmation unit 124. To be more precise, the web server 122 analyzes the URL received as a result of S505, thereby deriving the parameters concerning the printer 114. Subsequently, the service registration confirmation unit 124 sends the registration confirmation acceptance unit 131 of the service management apparatus 130 an inquiry about a confirmation as to whether or not the printer 114 is registered for the point reward service as the second support service. The confirmation of the presence of the registration is carried out by using part of the parameters derived by the web server 122 in this step, namely, the respective parameters of the model, the serial number, and the MAC address of the printer 114.

In S507, the CPU of the service management apparatus 130 functions as the registration confirmation acceptance unit 131, and confirms whether or not the printer 114 is registered for the point reward service. To be more precise, using the parameters obtained as a result of S506, the registration confirmation acceptance unit 131 confirms whether or not the same parameters as these parameters are held in the registered information table 134. The registration confirmation acceptance unit 131 determines that the printer 114 is registered in the case where the parameters are held therein. On the other hand, the registration confirmation acceptance unit 131 determines that the printer 114 is not registered in the case where the parameters are not held therein.

A table 601 shown in FIG. 6 is an example of the registered information table 134. If the target printer is registered for the point reward service being the second support service, the respective parameters of the model, the serial number, the MAC address, and a registration id corresponding to the target printer are held in the registered information table 134. Here, a parameter of the temporary id allocated to the printer at the time of registration of the printer is held in a column of the registration id in the table 601, more details of which will be described later.

For example, an assumption is made here that the registration confirmation acceptance unit 131 accepts an inquiry with the parameters of TS6300 representing the model, AAAAAAAAAA representing the serial number, and BBBBBBBBBB representing the MAC address. In this case, the registration confirmation acceptance unit 131 investigates whether or not information on the printer that completely matches these parameters is held in the registered information table 134. Since the information that matches the parameters is held in the table 601 shown in FIG. 6, the registration confirmation acceptance unit 131 returns a value indicating "registered" to the service registration confirmation unit 124 of the service providing apparatus 120 which sent the inquiry. On the other hand, for example, if one of the parameters is different such as in a case where the parameters of TS6300 representing the model, AAAAAAAAAA representing the serial number, and DDDDDDDD representing the MAC address, the registration confirmation acceptance unit 131 returns a value indicating "not registered" to the service registration confirmation unit 124.

Although the determination of registration is made by using three pieces of the identification information in the above-described example, the determination of registration may be made by using only a single piece of the identification information. For example, in the case where only the serial number of the printer is transmitted to the service providing apparatus 120 as the identification information on the printer, the service management apparatus 130 may carry out the determination of registration by using this serial number only.

In S508, the CPU of the service providing apparatus 120 functions as the service registration confirmation unit 124, and determines whether or not the target printer is registered for the point reward service based on the value received as a result of S507. Specifically, the processing goes to S509 in the case where the value received as a result of S507 represents "registered". On the other hand, the processing goes to S510 in the case where the value received as a result of S507 represents "not registered".

Figure 7:
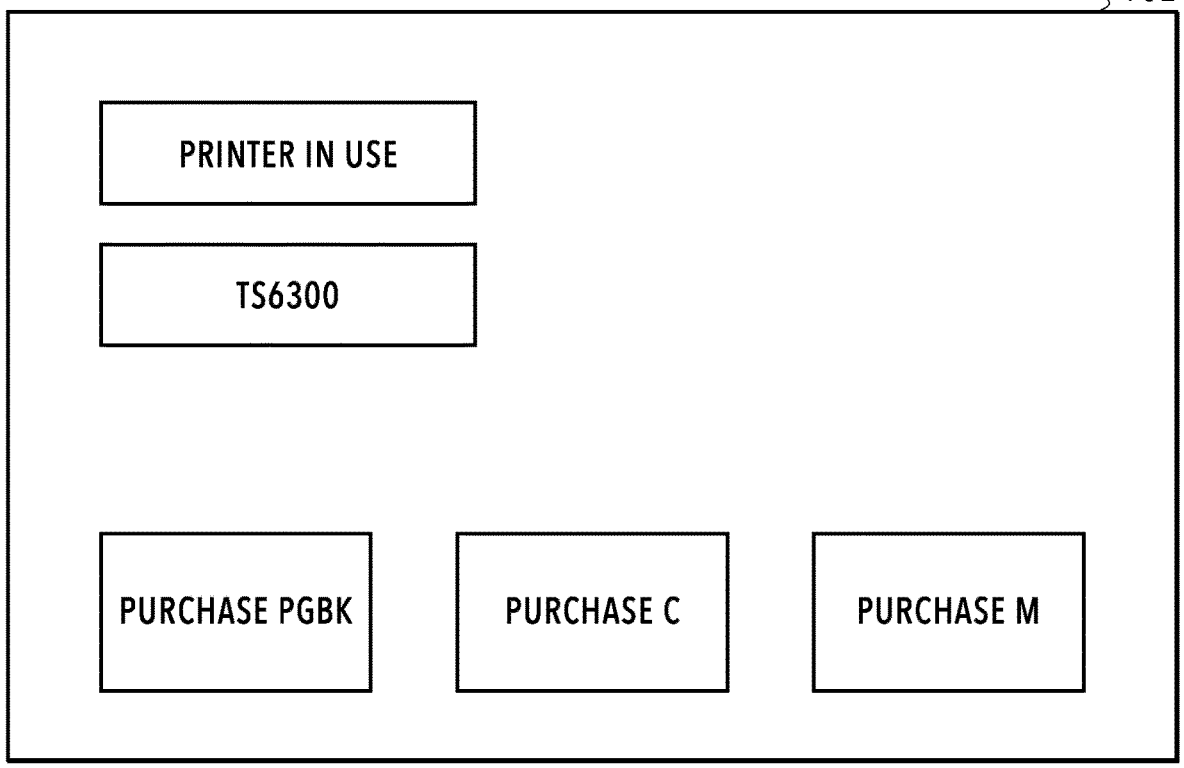
FIG. 7 is a diagram showing an example of an ink purchase GUI screen (in a case of not providing a register button) of the first embodiment.

In the case where the target printer is determined to be registered in S508, the web server 122 transmits an HTML file for a home page of a conventional ink purchase site generated by the screen information generation unit 123 to the web browser 111 of the client terminal 110. In this case, the CPU 201 of the client terminal 110 functions as the web browser 111 in S509. The web browser 111 presents the conventional ink purchase site (a screen for receiving the ink selling (purchase) service being the first support service) to the user by displaying an ink purchase GUI screen on the display unit 205, for instance. An ink purchase GUI screen 701 shown in FIG. 7 is an example of the ink purchase GUI screen to be displayed in this step.

On the other hand, in the case where the target printer is determined to be not registered in S508, the service providing apparatus 120 requests a temporary registration of the target printer for the point reward service in S510. In this step, the CPU of the service providing apparatus 120 functions as the temporary id issuance requesting unit 126. To be more precise, the temporary id issuance requesting unit 126 requests the temporary registration by transmitting the respective parameters of the model, the serial number, and the MAC address of the printer to the temporary registration acceptance unit 133 of the service management apparatus 130.

In S511, the CPU of the service management apparatus 130 functions as the temporary registration acceptance unit 133 and carries out the temporary registration. To be more precise, the temporary registration acceptance unit 133 issues an id for temporary registration (hereinafter referred to as a "temporary registration id") based on the respective parameters of the model, the serial number, and the MAC address of the printer 114 which the service management apparatus 130 receives as a result of S510. Then, the temporary registration acceptance unit 133 carries out the temporary registration by linking the respective parameters of the model, the serial number, and the MAC address of the printer 114 to a value of the issued temporary registration id, and additionally describing these values in the id table 135. Here, the temporary registration id to be issued in this step may be determined at random. However, the unique temporary registration id needs to be determined in the id table 135.

An id table 602 shown in FIG. 6 is an example of the id table used in S511. As shown in the id table 602, the respective parameters of the model, the serial number, and the MAC address of the printer 114 received from the temporary id issuance requesting unit 126, as well as the value of the temporary registration id issued to be linked to these parameters and used in a formal registration subsequent thereto are additionally described in the table. After the information is added to the id table 602, the temporary registration acceptance unit 133 returns the value of the issued temporary registration id (which is "3333" in the present example) to the temporary id issuance requesting unit 126.

The CPU of the service providing apparatus 120, which receives the value of the temporary registration id as a result of S511, functions as the screen information generation unit 123 and the web server 122 in S512. To be more precise, the screen information generation unit 123 generates an HTML, file for drawing an ink purchase GUI screen 801, which is provided with a "register" button 802 for the point reward service unlike the conventional ink purchase GUI screen 701. Then, the web server 122 transmits this HTML file to the web browser 111 of the client terminal 110.

In S513, the CPU 201 of the client terminal 110 functions as the web browser 111. To be more precise, the web browser 111 displays the ink purchase GUI screen 801 with the "register" button 802 for the point reward service on the display unit 205, thereby presenting the ink purchase site where it is possible to register for the point reward service being an unregistered support service.

Figure 8:
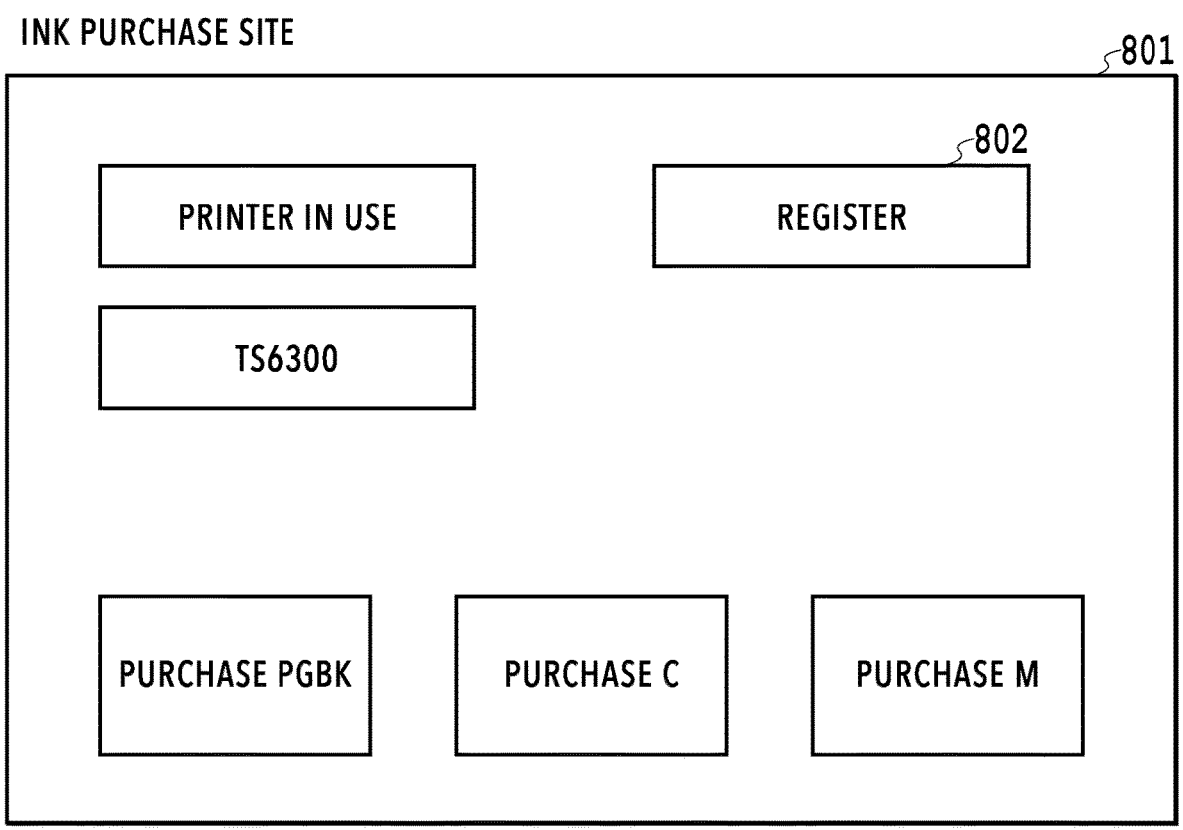
FIG. 8 is a diagram showing an example of the ink purchase GUI screen (in a case of providing the register button) of the first embodiment.

The ink purchase GUI screen 801 shown in FIG. 8 is an example of the ink purchase GUI screen displayed in S513. As shown in FIG. 8, the ink purchase GUI screen 801 displayed in S513 includes the "register" button 802 serving as an instruction item that enables instruction for registration for the point reward service, and this point is different from the ink purchase GUI screen 701 (FIG. 7) to be displayed in S509. Here, if the "register" button 802 on the ink purchase GUI screen 801 is not pressed, the user can select and purchase the ink by pressing a different button on the ink purchase GUI screen 801 as with the conventional ink purchase site.

In S514, the CPU 201 of the client terminal 110 determines whether or not a "yes" button 902 on a registration GUI screen 901 (see FIG. 9) is pressed, the registration GUI screen 901 being displayed in the case where the "register" button 802 for the point reward service is pressed. The processing goes to S515 in the case where a result of determination in this step turns out to be true. On the other hand, the series of the processing is terminated in the case where the result of determination in this step turns out to be false.

Figure 9:
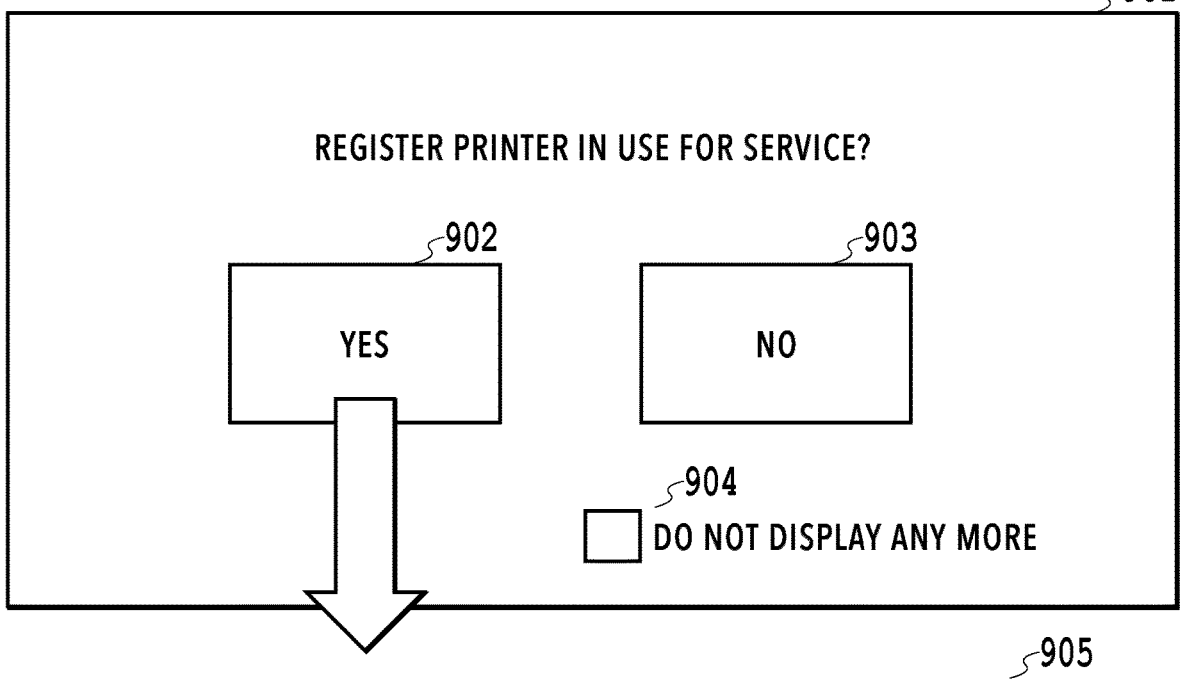
FIG. 9 is a diagram showing an example of a registration GUI screen of the first embodiment.

The registration GUI screen 901 shown in FIG. 9 is an example of the registration GUI screen to be displayed in the case where the "register" button 802 on the ink purchase GUI screen 801 is pressed. As shown in FIG. 9, the registration GUI screen 901 includes the "yes" button 902, a "no" button 903, and a check box 904.

In the case where the "no" button 903 is pressed by the user, the CPU 201 of the client terminal 110 closes the registration GUI screen 901 without executing any processing.

On the other hand, in the case where the "yes" button 902 or the "no" button 903 is pressed in a state of checking the check box 904, the CPU 201 of the client terminal 110 closes the registration GUI screen 901. In this instance, information indicating that the check box is checked is saved in a cache of the web browser 111. As a consequence, the web browser 111 displays the ink purchase GUI screen 701 even if the target printer is not registered for the point reward service and the target printer receives the HTML file for generating the GUI screen provided with the "register" button in the case where the user displays the ink purchase site from then on. As shown in FIG. 7, the ink purchase GUI screen 701 is not provided with such a "register" button.

In the case where the "yes" button 902 is pressed by the user, a URL 905 is generated by attaching the respective parameters including the model, the serial number, and the MAC address of the printer, the result of determination (YES) in S514, and the like thereto as shown in FIG. 9. Then, the web browser 111 accesses the service providing apparatus 120 in accordance with the generated URL 905.

In S515, the CPU of the service providing apparatus 120 functions as the service registration requesting unit 125, and requests the registration (the formal registration following the temporary registration) of the target printer (which is the printer 114 in the present example) for the point reward service. To be more precise, the service registration requesting unit 125 requests the registration by transmitting the respective parameters of the model, the serial number, and the MAC address of the target printer to the service registration unit 132 of the service management apparatus 130.

Figure 10:
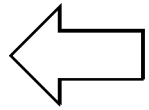
FIG. 10 is a diagram showing examples of tables of the first embodiment.

In S516, the CPU of the service management apparatus 130 functions as the service registration unit 132, and registers the target printer (which is the printer 114 in the present example) for the point reward service. To be more precise, the service registration unit 132 confirms whether or not the respective parameters of the model, the serial number, and the MAC address of the target printer received as a result of S515 are held in the id table 135. For example, a case where an id table 1002 (FIG. 10) is used as the id table 135 and the parameters in the registration request includes "TS6300" representing the model, "EEEEEEEEEE" representing the serial number, and "FFFFFFFFFF" representing the MAC address will be considered. In this case, the respective parameters included in the registration request are held in the id table 1002. Therefore, the service registration unit 132 additionally describes the contents in a registered information table 1001 as shown in FIG. 10, which are the same contents as those held in the id table 1002. The registration of the target printer for the point reward service is completed by adding the information to the registered information table 1001 as described above.

As a result of S516, the service registration requesting unit 125 receives a registration completion notice transmitted from the service registration unit 132. After receiving the registration completion notice, the web server 122 transmits an HTML file for generating a GUI screen to present a state of completion of the registration of the target printer for the point reward service to the web browser 111 in S517. This HTML file is generated by the screen information generation unit 123.

Effects of Present Embodiment

As described above, the client terminal of the present embodiment transmits the information on the consumable supplies and the identification information on the printer in use to the service providing apparatus in the case where the button to guide to the screen of the service for selling the consumable supplies being the first support service is pressed. The service providing apparatus which receives the identification information on the printer confirms the status of registration (the status of service subscription) of the target printer for the point reward service being the second support service by using the received identification information on the printer. Then, in the case where the target printer is not registered for the second support service, the service providing apparatus transmits the information on the GUI screen to the client terminal, the GUI screen being provided with the "register" button serving as the instruction item used for the registration for the second support service. Thus, the user can proceed with the processing to register the printer in use for the second support service being the unregistered support service by pressing the "register" button provided on the screen of the first support service.

The above-described embodiment discusses the example in which the "register" button for the registration for the second support service is provided on the screen of the first support service. However, the present embodiment is not limited only to this configuration. The screen of the first support service and the screen for the registration of the second support service may be displayed in parallel. In other words, the item for the registration (for proceeding with the registration) for the second support service only needs to be displayed based on an instruction for receiving the first support service.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to conduct a registration for a support service easily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-106361, filed Jun. 28, 2021, which is hereby incorporated by reference wherein in its entirety.

What is claimed is:

1. A system comprising:
a printing apparatus;
an information processing apparatus on which software for using a function of the printing apparatus is installed; and
a server system, wherein
the printing apparatus includes an output unit configured to output identification information on the printing apparatus,
the information processing apparatus includes
a transmission unit configured to transmit the identification information on the printing apparatus obtained from the printing apparatus based on acceptance of an instruction for receiving a first service through a screen provided by the software, and
a display control unit configured to perform display control of the information processing apparatus,
the server system includes
a confirmation unit configured to execute processing for confirmation as to whether or not the printing apparatus identified by the identification information on the printing apparatus transmitted from the information processing apparatus is registered for a second service being different from the first service, and
a providing unit configured to provide data for displaying an item for the second service in a case where the printing apparatus is not registered for the second service, and
the display control unit displays an item for registering the printing apparatus for the second service on a display unit of the information processing apparatus based on the provided data.

2. The system according to claim 1, wherein
the server system provides screen data of the first service including the item as the data, and
the screen of the first service including the item is displayed on the display unit of the information processing apparatus.

3. The system according to claim 1, wherein a screen for registration for the second service is displayed in a case where the item is prescribed by a user.

4. The system according to claim 1, wherein
the confirmation unit of the server system outputs the identification information on the printing apparatus transmitted from the information processing apparatus as the processing for confirmation,
determination processing is executed based on the identification information on the printing apparatus so as to determine whether or not the printing apparatus is registered for the second service, and
the confirmation unit obtains a result of the determination processing.

5. The system according to claim 1, wherein
the printing apparatus further outputs information on a consumable supply in the printing apparatus, and
the information processing apparatus further includes an obtaining unit configured to obtain the identification information and the information on the consumable supply outputted from the printing apparatus.

6. The system according to claim 5, wherein the obtaining unit is activated in a case where a prescribed event takes place in the printing apparatus or in a case where a user performs a prescribed operation.

7. The system according to claim 6, wherein the prescribed event is a fall of a remaining amount of the consumable supply equal to or below a predetermined threshold.

8. The system according to claim 1, wherein
the server system further includes a temporary id issuance requesting unit configured to request issuance of a temporary id of the printing apparatus in the case where the printing apparatus is not registered for the second service, and
the providing unit provides the data in a case where the temporary id is issued.

9. The system according to claim 1, wherein processing to request registration of the printing apparatus for the second service is executed in a case where the item is prescribed by a user.

10. The system according to claim 1, wherein
a registration screen is displayed in a case where the item is prescribed by a user, the registration screen includes a check box, and
in a case where the registration screen is closed in a state where the check box is checked, a screen including the item is not displayed from then on based on acceptance of an instruction for receiving the first service.

11. The system according to claim 1, wherein the first service is a service to sell a consumable supply.

12. The system according to claim 1, wherein the data is an HTML, file.

13. A method of controlling a system including a printing apparatus, an information processing apparatus on which software for using a function of the printing apparatus is installed, and a server system, the method comprising:

an outputting step of causing the printing apparatus to output identification information on the printing apparatus;

a transmitting step of causing the information processing apparatus to transmit the identification information on the printing apparatus obtained from the printing apparatus based on acceptance of an instruction for receiving a first service through a screen provided by the software;

a display controlling step of causing the information processing apparatus to perform display control of the information processing apparatus;

a confirming step of causing the server system to execute processing for confirmation as to whether or not the printing apparatus identified by the identification information on the printing apparatus transmitted from the information processing apparatus is registered for a second service being different from the first service; and a providing step of causing the server system to provide data for displaying an item for the second service in a case where the printing apparatus is not registered for the second service, wherein an item for registering the printing apparatus for the second service is displayed on a display unit of the information processing apparatus based on the provided data in the display controlling step.

* * * * *